United States Patent Office 3,409,429
Patented Nov. 5, 1968

3,409,429
TRANSPARENCY AND METHOD OF MAKING AND USING A THIN TRANSPARENT RADIATION SENSITIVE FILM CONSISTING ESSENTIALLY OF TITANIUM DIOXIDE
Carl F. W. Ekman, Bedford, and Janet M. Norbury, Waltham, Mass., assignors to Itek Corporation, Lexington, Mass., a corporation of Delaware
No Drawing. Filed Apr. 15, 1964, Ser. No. 360,113
11 Claims. (Cl. 96—27)

ABSTRACT OF THE DISCLOSURE

This invention relates to methods of making radiation-sensitive substrates, methods of making information-containing photographic transparencies, and to novel photographic transparencies produced from and used in these processes. A radiation-sensitive titanium dioxide surface suitable for the production of photographic images is produced by heating a titanium-containing surface in an oxidizing atmosphere at a temperature between about 400° C. and about 900° C. wherein this titanium-containing surface is a film of a titanium compound selected from the groups, consisting of hydrolyzable titanium esters and polymers thereof. A photographic transparency is prepared, according to this invention, by exposing a transparent copy medium, comprising a transparent substrate having coated thereon a thin transparent radiation-sensitive film, said film consisting essentially of titanium dioxide with a pattern of activating radiation, thereby rendering the titanium dioxide chemically reactive in portions thereof corresponding to the image pattern of radiation, and then developing the chemically reactive portions of the titanium dioxide by contacting at least the reactive portions with image forming materials to form an irreversible image corresponding to the image pattern. The photographic transparency of this invention comprises a transparent substrate having coated thereon a thin transparent film, this film consisting essentially of titanium dioxide and including portions of different optical density defining an image pattern thereon.

The present invention relates to improved data storage media comprising radiation sensitive titanium dioxide, and to methods for preparing such improved data storage media.

Copending application Ser. No. 199,211, filed May 14, 1962, by Elliot Berman et al., relates to methods for producing a visible image in a copy medium comprising a semiconductor material such as titanium dioxide by exposing the medium to an image pattern of activating radiation. This renders portions of the titanium dioxide which have been struck by the activating radiation chemically reactive in a pattern corresponding to the image pattern of radiation. The copy medium is then developed by contacting it with a redox system chemically reacting on contact with chemically reactive portions of the exposed medium to form a visible image corresponding to the image pattern of radiation.

The copending application relates to copy media comprising a substrate which is filled or coated with a photoconductor. For example, the copending application discloses papers filled with titanium dioxide pigments or coated with such pigments deposited in an adhesive binder on the paper.

The present invention is directed to a radiation sensitive titanium dioxide transparent copy media that has greater degree of transparency than the titanium dioxide layers disclosed in the copending application.

According to the present invention, a number of improved copy media have been prepared by the oxidation of titanium-containing surfaces such as of titanium metal or of organic titanium compounds at temperatures of from 400° C. to about 900° C. In particular, the organic titanium compounds, when oxidatively decomposed under the conditions specified, can form highly transparent radiation sensitive titanium oxide layers which, if present on a transparent substrate, are adaptable to the production of photographic transparencies. In still another embodiment of the invention, a titanium foil surface is oxidized under the oxidizing conditions to provide a radiation sensitive material comprising a flexible metallic titanium substrate and a radiation sensitive coating of titanium dioxide thereover. This material affords a flexible copy medium to which a photosensitive coating is tightly adhered in the absence of a binder. A copy medium of this type is particularly useful for use in vacuum systems, since there is no solvent or binder present to volatize and destroy the vacuum. For example, the medium can be used for the direct recording of the electron beam traces of a cathode ray tube.

The titanium-containing surfaces of the invention are converted to titanium dioxide by heating in an oxidizing atmosphere such as of air, oxygen, ozone, or oxygen in a mixture with gases such as nitrogen, the rare gases, or carbon dioxide which are inert to the coatings under the heating conditions used.

To form radiation sensitive titanium dioxide, the surfaces are heated to temperatures of from about 400° C. to about 900° C. for a period of time which may vary with the temperature of heating but is generally between ½ hour and 10 hours. Heating at times or temperatures above or below these limits gives titanium dioxide films which lack radiation sensitivity, or which are objectionably colored, or which are powdery and non-adherent.

As mentioned, the titanium-containing surfaces which are oxidized according to the invention may comprise free metallic titanium or chemically-bound titanium. The free metal surface may be the surface of titanium in a bulk form, as for example the surface of a titanium foil. Alternatively, it may be a titanium metal film supported on a non-titanium oxidation-resistant substrate. The evaporation of such films onto a substrate in vacuum is a technique well known in the art.

Materials containing chemically-bound titanium which are suitable for forming radiation sensitive titanium dioxide coatings include organic titanates such as hydrolyzable aliphatic esters of titanic acid, and the polymers formed by hydrolysis thereof. The materials are commercially available as "Tyzor" organic titanates and include water-sensitive tetra-alkyl esters such as the tetra-isopropyl-, tetra-butyl-, tetra-stearyl-, and tetrakis-(2-ethylhexyl)-titanates.

These esters, when applied to a moist substrate, or when present on a substrate in the presence of atmospheric moisture, readily hydrolyze to form polymers on the substrates.

Organic titanium esters of this type are also available commercially in prepolymerized form, and the use of a prepolymerized butyl titanate for TiO₂ film formation according to the present invention has proved particularly successful.

Still other titanate materials which can be used according to the present invention for the formation of radiation sensitive $TiO_2$ films include certain chelated titanate structures such as the ammonium salt of titanium lactate or titanium acetyl acetonate. These chelated materials are more resistant to hydrolysis than are the tetra-alkyl esters, but can also be used according to the present invention for the formation of titanium dioxide films.

The organic titanium compounds mentioned are conveniently applied to a substrate in the form of a thin film of the material, if liquid, or a solution thereof, suitably by dipping, spraying, painting, or the like, with subsequent removal of any excess fluid. The compounds are soluble in organic solvents including alcohols such as isopropanol, hydrocarbons such as hexane, heptane and benzene, and halogenated solvents such as trichloroethylene or carbon tetrachloride. On heating, thin transparent films of titanium oxide were produced.

A better understanding of the present invention and of its many advantages will be had by referring to the following specific examples given by way of illustration.

Example 1

A partially polymerized butyl titanate polymer of the approximate formula $C_4H_9OTi(OC_4H_9)_2O_nC_4H_9$, in which $n$ appears to be about 8, was dissolved in hexane to form a two percent solution of the polymer. Clean glass slides were dipped into the solution, and excess solution was permitted to drip from the slides. The coated slides were then heated at a temperature from 400°–500° C. for two hours, whereupon a thin transparent film of titanium dioxide was produced on the films.

The coated slides were used for the production of photographic images by exposure of the slides to an image pattern for two seconds using a Beseler box having a "Hanovia" lamp therein. The activated surface of the slides was next developed by brief contact of the slides with a methanolic solution of silver nitrate, and then with an image intensifying solution containing phenidone to cause additional silver to precipitate on the image areas of the glass slide where invisible quantities of metallic silver had already been deposited by contact of the activated titanium dioxide surfaces with silver ion from the first solution. Additional silver ion for further deposition is present on the slides in small quantities from the first solution, which adheres to the slide during further development.

If desired, the titanium dioxide transparencies may be coated with a thin transparent protective film to prevent damage to the titanium dioxide coating. Conventional plastic materials, such as polyacrylates, can be used to provide such a coating, but should remain permeable to the solutions which are used for developing the image in the underlying titanium dioxide film.

Other transparent substrates, such as of quartz or mica can be used instead of glass to support the films.

Monochromatic color transparencies can be produced by the use of developing solutions containing dyes reactive with radiation, e.g. methylene blue.

Polychromatic color transparencies can also be prepared by exposure of a coated slide through a screened negative, development with known agents forming color by the precipitation of silver and simultaneous dye-forming coupling reactions between a coupling agent and developer oxidation products, removal of precipitated silver, re-exposure through a second screened negative, redevelopment in the presence of coupling agents forming a dye of a second color, etc.

Example 2

Thin titanium films were prepared by the evaporation of metallic titanium in vacuum by the passage of an electric current through a titanium filament in proximity to a quartz substrate. The resultant titanium films, deposited on the quartz substrate, were oxidized in air at temperatures from 400° C. to 900° C. At these temperatures, radiation sensitive films were obtained. The films were translucent. At temperatures above 900° C., the films became opaque and images could not be formed therein.

Example 3

Pieces of titanium foil were heated in air at temperatures between 400° and 900° C. to form thin films of titanium oxide thereon.

The impingement of electron beams on the titanium dioxide film coating the foil causes activation of the titanium dioxide where struck. The material is chemically reactive and subject to later development by contact with a material such as silver ion which is reduced to metallic silver on such contact.

Although specific embodiments have been described herein, it should be understood that they are illustrative and are not limiting on the scope and spirit of the invention.

What is claimed is:

1. The method of making a radiation-sensitive titanium dioxide surface suitable for the production of photographic images which comprises heating a titanium-containing surface in an oxidizing atmosphere at a temperature between about 400° C. and about 900° C. wherein said titanium-containing surface is a film of a titanium compound selected from the groups consisting of hydrolyzable titanium esters and polymers thereof.

2. The method of making a photographic transparency which comprises coating a transparent substrate with a thin transparent radiation sensitive film, said film consisting essentially of titanium dioxide, exposing said coated substrate to a pattern of activating radiation thereby rendering said titanium dioxide chemically reactive in portions thereof corresponding to said image pattern of radiation, and then developing said chemically reactive portions of said titanium dioxide by contacting at least said reactive portions with a liquid redox system chemically reacting on contact to form an irreversible image corresponding to said image pattern.

3. The method as in claim 2 which includes coating a transparent substrate with a thin film of an organic titanate, and then heating in an oxidizing atmosphere said titanate to form said thin transparent radiation sensitive film of titanium dioxide.

4. The method of claim 3 wherein said organic titanate is selected from the group consisting of hydrolyzable titanium esters and polymers thereof.

5. The method of making a photographic transparency which compirses exposing a transparent copy medium comprising a transparent substrate having coated thereon a thin transparent radiation-sensitive film, said film consisting essentially of titanium dioxide to a pattern of activating radiation, thereby rendering said titanium dioxide chemically reactive in portions thereof corresponding to said image pattern of radiation, and then developing said chemically reactive portions of said titanium dioxide by contacting at least said reactive portions with image forming materials to form an irreversible image corresponding to said image pattern.

6. The method as in claim 5 wherein said transparent copy medium is coated with a thin transparent protective film to prevent damage to the titanium dioxide coating.

7. A photographic transparency comprising a transparent substrate having coated thereon a thin transparent film, said film consisting essentially of titanium dioxide and including portions of different optical density defining an image pattern thereon.

8. A transparency as in claim 7 wherein said image pattern is defined by an optically dense material deposited on said film.

9. A transparency as in claim 8 wherein said optically dense material is a dye.

10. A transparency as in claim 8 wherein said optically dense material is a metal.

11. A transparency as in claim 10 wherein said metal is silver.

References Cited

UNITED STATES PATENTS

| | | | |
|---|---|---|---|
| 2,908,593 | 10/1959 | Naidus | 117—221 X |
| 3,112,222 | 11/1963 | Alger | 117—221 X |
| 3,142,814 | 7/1964 | Robinson | 117—221 X |
| 3,148,057 | 9/1964 | Raether | 117—221 X |
| 3,152,903 | 10/1964 | Shepard et al. | 96—64 |
| 3,254,253 | 5/1966 | Davis et al. | 117—221 X |
| 3,314,795 | 4/1967 | Dorion et al. | 96—90 |

NORMAN G. TORCHIN, *Primary Examiner.*

C. E. VAN HORN, *Assistant Examiner.*